(12) United States Patent
Hayashi

(10) Patent No.: US 11,190,650 B2
(45) Date of Patent: Nov. 30, 2021

(54) MANAGEMENT APPARATUS THAT ESTIMATES LOAD OF THE MANAGEMENT APPARATUS

(71) Applicant: BROTHER KOGYO KABUSHIKI KAISHA, Nagoya (JP)

(72) Inventor: Koichi Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/816,402

(22) Filed: Mar. 12, 2020

(65) Prior Publication Data

US 2020/0296235 A1  Sep. 17, 2020

(30) Foreign Application Priority Data

Mar. 15, 2019  (JP) ............................. JP2019-049058

(51) Int. Cl.
*H04N 1/00* (2006.01)
*H04L 29/08* (2006.01)
(Continued)

(52) U.S. Cl.
CPC ....... *H04N 1/00344* (2013.01); *G06F 3/1204* (2013.01); *G06F 3/1229* (2013.01); *G06F 3/1231* (2013.01); *G06F 3/1285* (2013.01); *G06K 15/40* (2013.01); *H04L 67/1004* (2013.01); *H04N 1/00214* (2013.01); *H04N 1/00954* (2013.01); *G06F 3/1293* (2013.01)

(58) Field of Classification Search
None
See application file for complete search history.

(56) References Cited

U.S. PATENT DOCUMENTS

2002/0159777 A1* 10/2002 Nagata ................. G06Q 10/087
399/8
2009/0033993 A1* 2/2009 Nakazato .............. G06F 3/1218
358/1.15
(Continued)

FOREIGN PATENT DOCUMENTS

JP       2005-092645 A    4/2005
JP       2011-128995 A    6/2011
(Continued)

*Primary Examiner* — Miya J Williams
(74) *Attorney, Agent, or Firm* — Scully Scott Murphy and Presser

(57) ABSTRACT

A management apparatus receives a data set from a target device that is one of a plurality of devices, the data set including a data type, a data body, and identification information of the target device; each time the data set is received, calculates scheduled transmission time for the target device based on reception time of the data set and on the identification information and the data type; estimates a load of the management apparatus at the scheduled transmission time based on the scheduled transmission time and on next transmission time of the data set for the plurality of devices other than the target device; and in a case where the load is higher than a particular level, transmit, to the target device, corrected transmission time as next transmission time for the target device, the corrected transmission time being obtained by adding a correction value to the scheduled transmission time.

25 Claims, 6 Drawing Sheets

(51) Int. Cl.
   *G06F 3/12*    (2006.01)
   *G06K 15/00*   (2006.01)

(56) References Cited

U.S. PATENT DOCUMENTS

| | | | | |
|---|---|---|---|---|
| 2011/0149344 | A1* | 6/2011 | Nakamura | H04N 1/00923 358/1.15 |
| 2012/0062944 | A1* | 3/2012 | Nakamoto | G06F 8/654 358/1.15 |
| 2017/0006171 | A1* | 1/2017 | Kaneko | H04N 1/00055 |
| 2017/0104849 | A1* | 4/2017 | Mizuno | H04L 67/325 |
| 2019/0294518 | A1* | 9/2019 | Ota | G06F 3/1203 |
| 2020/0099798 | A1* | 3/2020 | Takaoka | H04N 1/00244 |

FOREIGN PATENT DOCUMENTS

| | | |
|---|---|---|
| JP | 2017-073068 A | 4/2017 |
| JP | 2017-182576 A | 10/2017 |

\* cited by examiner

| ID | DATA TYPE | VALUE | DATE AND TIME OF RECEPTION |
|---|---|---|---|
| 001 | REMAINING AMOUNT OF INK | 50 | 2018-12-01 01:05:00 |
| 001 | NUMBER OF PRINTED SHEETS | 1200 | 2018-12-01 01:05:00 |
| 002 | REMAINING AMOUNT OF INK | 45 | 2018-12-01 02:05:00 |
| 002 | NUMBER OF PRINTED SHEETS | 1250 | 2018-12-01 02:05:00 |
| ... | ... | ... | ... |

| ID | DATA TYPE | TRANSMISSION CYCLE |
|---|---|---|
| 001 | REMAINING AMOUNT OF INK | t1 |
| 001 | NUMBER OF PRINTED SHEETS | t2 |
| 002 | REMAINING AMOUNT OF INK | t3 |
| ... | ... | ... |

MANAGEMENT APPARATUS THAT ESTIMATES LOAD OF THE MANAGEMENT APPARATUS

CROSS REFERENCE TO RELATED APPLICATIONS

This application claims priority from Japanese Patent Application No. 2019-049058 filed Mar. 15, 2019. The entire content of the priority application is incorporated herein by reference.

TECHNICAL FIELD

This disclosure relates to a management apparatus, a load reduction system, a method of controlling a management apparatus, and a storage medium storing a control program.

BACKGROUND

A system is conventionally known in which devices (clients) periodically connect to a server (host) to upload data. A large number of devices send requests for connection with the server. There is an issue that, if that timing is coincident, connection cannot be made or the load of the server increases since a large amount of data processing need to be performed concurrently. In order to solve this, a technique for mitigating concentration of access load to the server is developed. For example, there is a known server that, when transmission data is received from a device, estimates next data reception time from the device based on the reception time and on transmission cycle determination information, and adjusts reception time if the estimate reception time is the same time as estimate reception time of another device.

SUMMARY

According to one aspect, this specification discloses a management apparatus. The management apparatus includes an interface configured to communicate with a plurality of devices, a controller, and a memory storing instructions. The instructions, when executed by the controller, cause the management apparatus to perform: receiving a data set from a target device that is one of the plurality of devices via the interface, the data set including a data type, a data body, and identification information of the target device; each time the data set is received, calculating scheduled transmission time for the target device based on reception time of the data set and on the identification information and the data type included in the data set, the scheduled transmission time being scheduled time at which the target device transmits the data set to the management apparatus; estimating a load of the management apparatus at the scheduled transmission time based on the scheduled transmission time and on next transmission time of the data set for the plurality of devices other than the target device; and in a case where the load is higher than a particular level, transmitting, to the target device via the interface, corrected transmission time as next transmission time for the target device, the corrected transmission time being obtained by adding a correction value to the scheduled transmission time.

According to another aspect, this specification also discloses a method of controlling a management apparatus configured to communicate with a plurality of devices. The method includes: receiving a data set from a target device that is one of the plurality of devices, the data set including a data type, a data body, and identification information of the target device; each time the data set is received, calculating scheduled transmission time for the target device based on reception time of the data set and on the identification information and the data type included in the data set, the scheduled transmission time being scheduled time at which the target device transmits the data set to the management apparatus; estimating a load of the management apparatus at the scheduled transmission time based on the scheduled transmission time and on next transmission time of the data set for the plurality of devices other than the target device; and in a case where the load is higher than a particular level, transmitting, to the target device, corrected transmission time as next transmission time for the target device, the corrected transmission time being obtained by adding a correction value to the scheduled transmission time.

According to still another aspect, this specification also discloses a non-transitory computer-readable storage medium storing a control program including a set of instructions readable by a controller of a management apparatus configured to communicate with a plurality of devices. The set of instructions, when executed by the controller, causes the management apparatus to perform: receiving a data set from a target device that is one of the plurality of devices, the data set including a data type, a data body, and identification information of the target device; each time the data set is received, calculating scheduled transmission time for the target device based on reception time of the data set and on the identification information and the data type included in the data set, the scheduled transmission time being scheduled time at which the target device transmits the data set to the management apparatus; estimating a load of the management apparatus at the scheduled transmission time based on the scheduled transmission time and on next transmission time of the data set for the plurality of devices other than the target device; and in a case where the load is higher than a particular level, transmitting, to the target device, corrected transmission time as next transmission time for the target device, the corrected transmission time being obtained by adding a correction value to the scheduled transmission time.

BRIEF DESCRIPTION OF THE DRAWINGS

Embodiments in accordance with this disclosure will be described in detail with reference to the following figures wherein:

FIG. 2 is a table showing one example of data structure of a data set database;

FIG. 3 is a table showing one example of data structure of a transmission time database;

DETAILED DESCRIPTION

In the above-mentioned technique, however, reception time is adjusted without considering the type of transmission data. Thus, if this technique is used, there is a possibility that data cannot be transmitted from a device to a server at appropriate timing. In view of the foregoing, an example of an objective of this disclosure is to perform transmission and reception of data at appropriate timing while preventing a temporary large load on a management apparatus.

First Embodiment

[Configuration of Load Reduction System 100]

Figure 1:
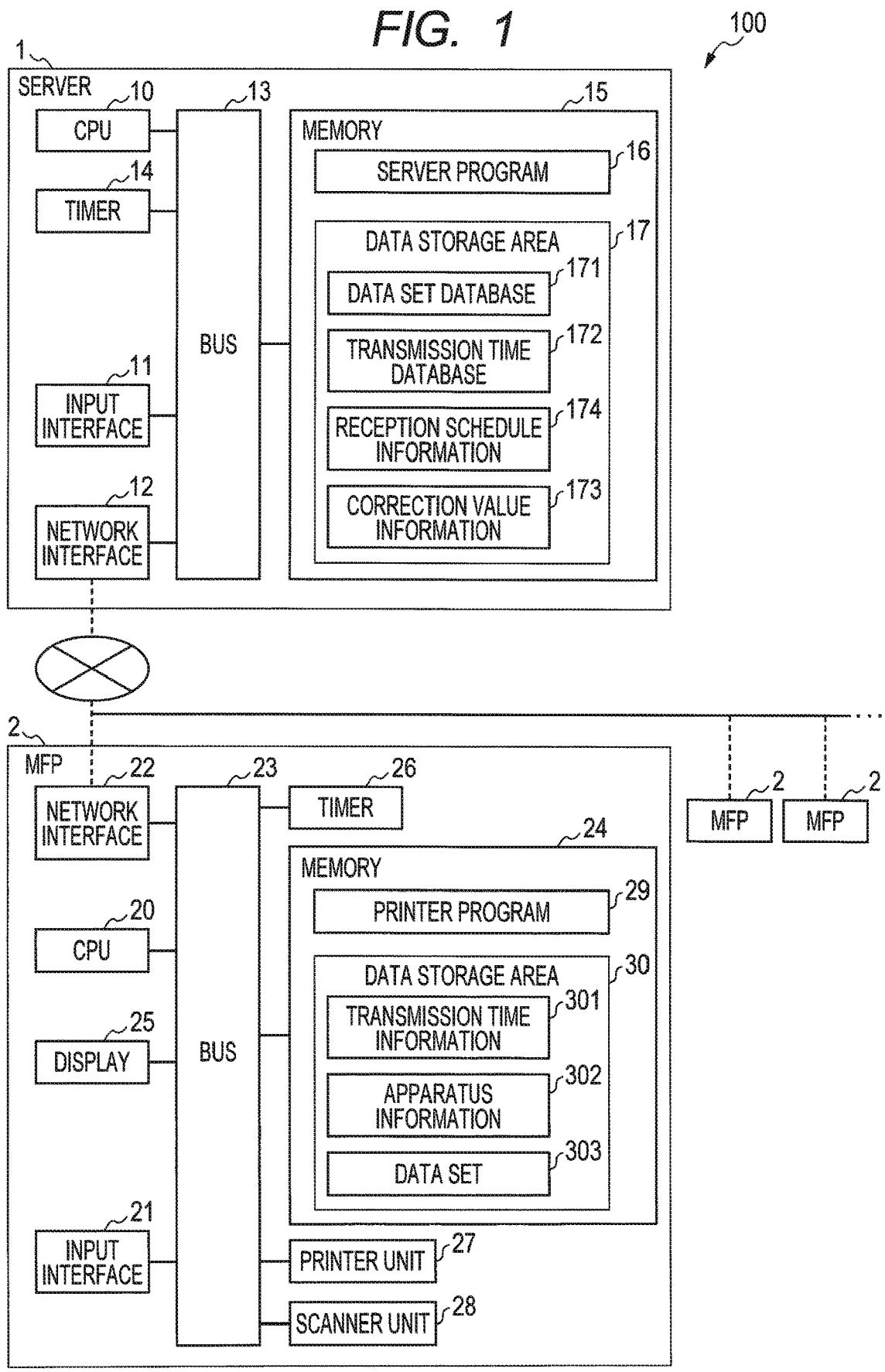
FIG. 1 is a block diagram showing the relevant parts of a load reduction system according to a first embodiment.

A first embodiment of this disclosure will be described below in detail. As shown in FIG. 1, a load reduction system 100 is a system for reducing the access load of a management apparatus that communicates with a plurality of devices. The load reduction system 100 includes a server 1 as one example of the management apparatus and a plurality of MFPs (multifunction peripherals) 2 as one example of a device. In the example of FIG. 1, each MFP 2 has similar configurations, and thus the internal configuration of one MFP is illustrated.

[Server 1]

The server 1 is a management apparatus that communicates with the plurality of MFPs 2. The server 1 includes a CPU 10, an input interface 11, a network interface 12, a bus 13, a timer 14, and a memory 15. Note that, in the server 1, the input interface 11 and the bus 13 are not essential. The memory 15 may be an external storage device connected to the server 1.

When the CPU 10 is notified about startup by the MFP 2, the CPU 10 transmits subscription information to the MFP 2 through the network interface 12. The subscription information is information including the type of data uploaded to the server 1 from the MFP 2, a transmission interval, and so on. Further, the CPU 10 executes processing of receiving a data set 303 from the MFP 2. Here, the data set 303 is information at least including identification information of the MFP 2, a data type, and a data body. Hereinafter, the identification information of the MFP 2 will be simply referred to as "identification information". The CPU 10 stores the data set 303 in a data set database 171 in the memory 15. Further, the CPU 10 executes processing of calculating scheduled transmission time at the MFP 2 (the scheduled time at which the data set 303 of the next time is transmitted from the MFP 2 to the server 1). Each time the data set 303 is received, the CPU 10 calculates the scheduled transmission time based on the reception time of the data set 303 and on the identification information and data type included in the data set 303. Here, the reception time of the data set 303 may be determined based on the time measured by the timer 14.

The CPU 10 further executes processing of estimating the load of the apparatus itself (that is, the server 1) at the calculated scheduled transmission time based on the calculated scheduled transmission time and on the next transmission time of data sets of the other MFPs 2 indicated by reception schedule information 174. As the method of estimating the load of the server 1, for example, time periods of a particular interval (for example, every one minute, every ten minutes, and so on) are set preliminarily. The CPU 10 determines to which time period the calculated scheduled transmission time belongs. Then, if the number of data received from the other MFPs 2 in that time period is larger than a particular number, the CPU 10 determines that the load is higher than a particular level. In a case where the load is lower than a particular level, the CPU 10 executes processing of transmitting, to the MFP 2, the calculated scheduled transmission time as the next transmission time. In a case where the load is higher than or equal to the particular level, the CPU 10 executes processing of transmitting, to the MFP 2, corrected transmission time that is obtained by adding a particular correction value to the calculated scheduled transmission time as the next transmission time.

The input interface 11 receives an input operation to the server 1 which is performed by a user. Upon receiving an input operation, the input interface 11 sends information indicative of this input operation to the CPU 10 through the bus 13.

The network interface 12 is a communication interface between the server 1 and the MFP 2. The network interface 12 receives a data set from the MFP 2, and stores the received data set in the memory 15. Further, next transmission time is transmitted to the MFP 2 through the network interface 12. The bus 13 connects each section of the server 1.

The memory 15 stores various data relating to the server 1. The memory 15 includes a server program 16 and a data storage area 17. The server program 16 is a computer program for realizing various functions of the server 1. The server program 16 is read out and executed by the CPU 10. The data storage area 17 stores data used by the server 1 and data that is collected and accumulated in the server 1. The data storage area 17 stores, for example, a data set database 171, a transmission time database 172, reception schedule information 174, and correction value information 173.

[Data Set Database 171]

As shown in FIG. 2, the data set database 171 is a database in which the data set 303 received by the CPU 10 from the MFP 2 is compiled. The data set database 171 includes four items of "ID", "data type", "value", and "date and time of reception", and has such a configuration that data of the item "ID" is associated with data of the other items. One record in the data set database 171 corresponds to one data set 303. The item "date and time of reception" is not essential in the data set 303.

As the item "ID", the data indicative of identification information of the MFP 2 is stored. As the item "data type", the information indicative of the data type of the value of the item "value" is stored. As the item "value", information serving as the data body of the data set 303 is stored. In the example of FIG. 2, as one example, the data set 303 includes the item "value" and a numerical value as the information serving as the data body. Alternatively, the data body may be data in another format such as a character string.

[Transmission Time Database 172]

As shown in FIG. 3, the transmission time database 172 is a database for specifying transmission time of data sets for each device and data type. The transmission time database 172 includes three items of "ID", "data type", and "transmission cycle", and has such a configuration that a combination of data of the item "ID" and "data type" is associated with data of the item "transmission cycle". As the item "ID", the data indicative of identification information of the MFP 2 is stored. As the item "data type", the information indicative of a data type is stored. As the item "transmission cycle", the information specifying the transmission cycle of the data set 303 for each combination of the identification information and the data type is stored.

The correction value information 173 is information for specifying a correction value. The correction value information 173 is referenced by the CPU 10. The reception schedule information 174 is information indicative of next transmission time that is sent from the CPU 10 to each MFP 2 through the network interface 12. That is, the reception schedule information 174 is information indicative of scheduled time at which the server 1 receives the data set 303 from each MFP 2. For example, the reception schedule information 174 is stored for each combination of the MFP 2 and the data type.

[MFP 2]

The MFP 2 has a print function and a scanner function. The MFP 2 includes, for example, a CPU 20, an input interface 21, a network interface 22, a bus 23, a memory 24, a display 25, a timer 26, a printer unit 27, and a scanner unit 28. The memory 24 may be an external storage device connected to the MFP 2.

The CPU 20 serves as a controller that performs overall control of the MFP 2. The CPU 20 reads out a printer program 29 (described later) from the memory 24 and executes the read printer program 29, thereby realizing various functions of the MFP 2.

For example, the CPU 20 creates the data set 303 as appropriate. For example, the CPU 20 receives information indicative of next transmission time from the server 1 through the network interface 22. The CPU 20 stores the received next transmission time in the memory 24 as transmission time information 301. For example, the CPU 20 executes processing of, when the measurement time of the timer 26 becomes equal to the time recorded as the transmission time information 301, transmitting the data set 303 to the CPU 10 of the server 1 through the network interface 22.

For example, after startup of the MFP 2, the CPU 20 receives subscription information from the server 1 through the network interface 22. Upon receiving the subscription information, the CPU 20 reads next transmission time described in the subscription information, and stores the read next transmission time in the memory 24 as the transmission time information 301.

For example, upon receiving information indicative of an input operation from the input interface 21, the CPU 20 may identify the content of the input operation and execute processing based on the operation. The CPU 20 may create an image to be outputted to the display 25. The CPU 20 may transmit control instructions to the printer unit 27 and the scanner unit 28 so as to control the operations of the printer unit 27 and the scanner unit 28.

The input interface 21 receives an input operation to the MFP 2 which is performed by a user. Upon receiving an input operation, the input interface 21 sends information indicative of the input operation to the CPU 20 through the bus 23.

The network interface 22 is a communication interface between the MFP 2 and the server 1. The network interface 22 transmits, to the server 1, the data set outputted from the CPU 20. The network interface 22 receives next transmission time from the server 1, and stores the received next transmission time in the memory 24. The bus 23 connects each section of the MFP 2.

The memory 24 stores various data relating to the MFP 2. The memory 24 includes the printer program 29 and a data storage area 30. The printer program 29 is a computer program for realizing various functions of the MFP 2. The printer program 29 is read out and executed by the CPU 20. The data storage area 30 stores data used by the MFP 2 and data that is collected and accumulated in the MFP 2. The data storage area 30 stores, for example, the transmission time information 301, apparatus information 302, and the data set 303.

The transmission time information 301 is information indicative of the next transmission time received by the CPU 20 from the server 1. The apparatus information 302 includes information relating to the MFP 2 itself including identification information of the MFP 2 and includes various information obtained by operating the MFP 2 such as state information indicative of the state (condition) of the MFP 2. The data set 303 is a set of data including various data that is transmitted from the MFP 2 to the server 1. The data set 303 is created by the CPU 20 and is stored in the memory 24.

The display 25 displays an image created by the CPU 20. The timer 26 measures time. The time measured by the timer 26 is inputted to the CPU 20.

The printer unit 27 is a mechanism for performing a print function of the MFP 2. The printer unit 27 prints an image, text, and so on, based on control by the CPU 20. The scanner unit 28 is a mechanism for performing a scan function of the MFP 2. The scanner unit 28 scans an object such as paper, based on control by the CPU 20.

[Applications Other than MFP 2]

The device in the load reduction system 100 may be a device other than the MFP 2. For example, the device may be a personal computer (PC), a terminal device such as a smartphone, or a home electrical appliance or a machine tool that are connectable to a network. In this case, these devices have configurations corresponding to the CPU 20, the network interface 22, the memory 24, and the timer 26 described above. In other words, in a case where a device other than the MFP 2 is used as the device of the load reduction system 100, the input interface 21, the bus 23, the display 25, the printer unit 27, and the scanner unit 28 are not necessary.

[Flow of Processing]

Figure 4:
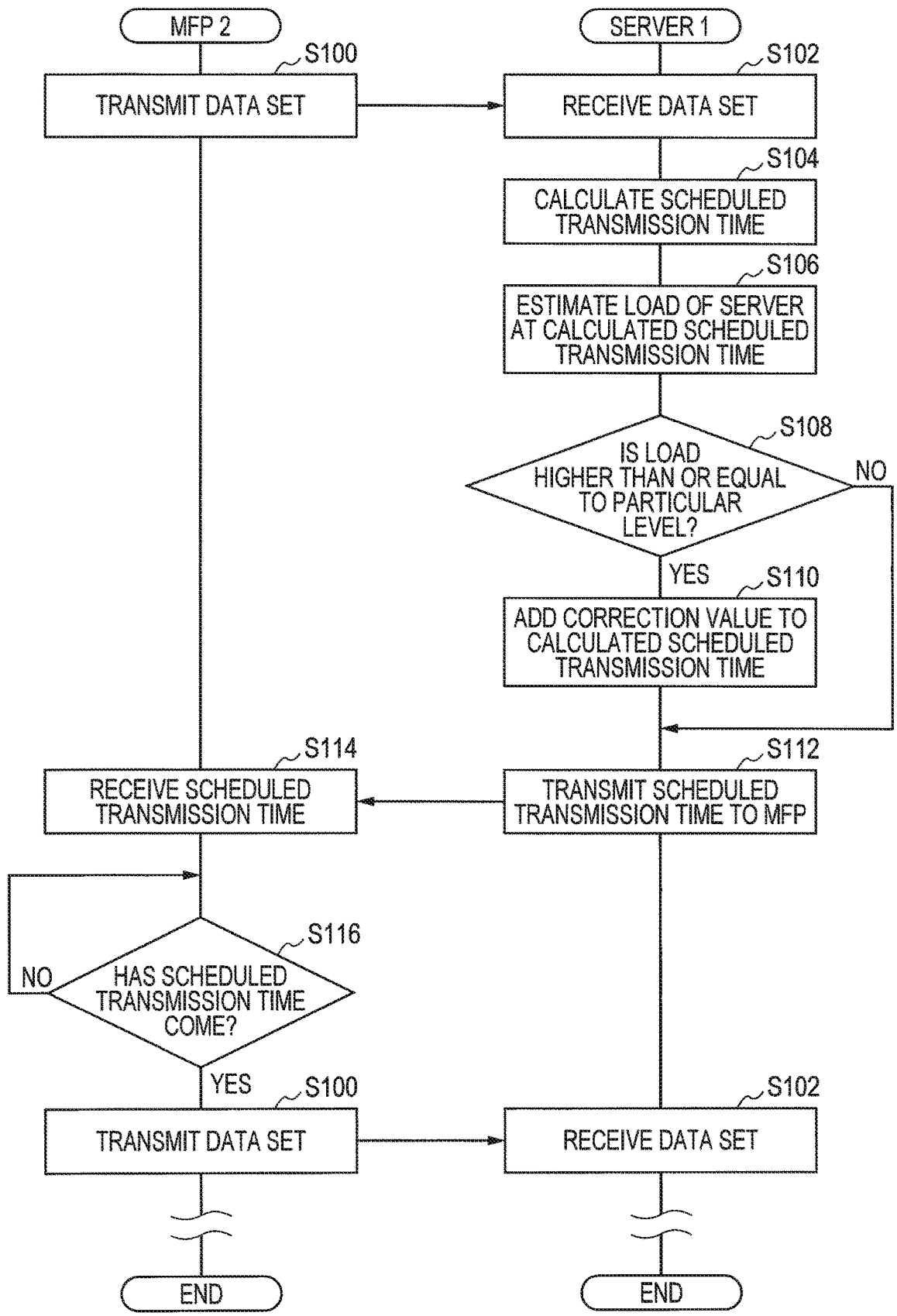
FIG. 4 shows one example of the flow of processing of a server and an MFP (multifunction peripheral) in the load reduction system according to the first embodiment.

One example of processing by the server 1 and the MFP 2 will be described while referring to the flowchart of FIG. 4. Note that, in FIG. 5 and thereafter, the same step as that in FIG. 4 is assigned with the same step number (S). After startup of the MFP 2, the CPU 20 of the MFP 2 receives subscription information from the server 1 through the network interface 22. Upon receiving the subscription information, the CPU 20 reads next transmission time described in the subscription information, and stores the next transmission time in the memory 24 as the transmission time information 301.

When the measured time inputted from the timer 26 becomes equal to the time recorded in the transmission time information 301, the CPU 20 reads out the data set 303 from the memory 24, and transmits the data set 303 to the server 1 through the network interface 22 (S100).

The CPU 10 of the server 1 receives the data set 303 through the network interface 12 (S102). The CPU 10 stores the data set 303 in the data set database 171 in the memory 15. Each time the data set 303 is received, the CPU 10 calculates scheduled transmission time of the MFP 2 based on the reception time of the data set 303 and on the identification information of the MFP 2 and the data type included in the data set 303 (S104). For example, the CPU 10 may calculate the scheduled transmission time, by referring to the transmission time database 172 to identify the transmission cycle associated with the identification information and data type and by adding the identified transmission cycle to the reception time.

Then, the CPU 10 estimates the load of the apparatus itself at the calculated scheduled transmission time based on the calculated scheduled transmission time and on next transmission time of data sets of other MFPs 2 indicated by the reception schedule information 174 (S106). In a case where the load is lower than a particular level (S108: NO), the CPU 10 transmits, to the MFP 2, the calculated scheduled transmission time as next transmission time. In a case where the load is higher than or equal to the particular level (S108: YES), the CPU 10 adds a particular correction value to the calculated scheduled transmission time, thereby obtaining the next transmission time (S110).

The CPU 10 transmits the next transmission time to the MFP 2 through the network interface 12, thereby notifying the MFP 2 about either one of the above-mentioned times (S112). The CPU 20 of the MFP 2 receives the notification of the time through the network interface 22 (S114). The CPU 20 stores the received next transmission time in the memory 24 as the transmission time information 301.

The CPU 20 stands by until the time measured by the timer 26 becomes equal to the time recorded as the transmission time information 301, that is, the time received from the server 1 (S116: NO). When the received time comes (S116: YES), the CPU 20 again executes the processing of S100. That is, the CPU 20 reads out the data set 303 from the memory 24, and transmits the read data set 303 to the server 1 through the network interface 22 (S100). The CPU 10 of the server 1 receives the data set 303 through the network interface 12 (S102). Subsequently, the processing of S104 and thereafter is executed again.

With this operation, in the load reduction system 100, each time the MFP 2 transmits the data set 303 to the server 1, the MFP 2 receives the next transmission time from the server 1. When the received time comes, the MFP 2 transmits the data set 303 to the server 1. That is, the processing of S100 to S116 is executed repeatedly.

According to the above-described processing, in a case where it is estimated the server 1 has a load of a particular level or higher at the scheduled transmission time of the MFP 2, the transmission time of the data set 303 from the MFP 2 is shifted to a later timing. The transmission time is calculated based on the data type included in the data set 303. Thus, according to the above-described processing, while preventing a temporary large load on the server 1, transmission and reception of the data set 303 can be performed at appropriate timing depending on the data type.

In the present embodiment, the CPU 10 calculates scheduled transmission time, and transmits the scheduled transmission time or corrected transmission time to the MFP 2 as the next transmission time. Alternatively, the CPU 10 may calculate a scheduled transmission cycle instead of the scheduled transmission time. And, the CPU 10 may transmit, to the MFP 2, the scheduled transmission cycle as it is or a corrected transmission cycle obtained by adding a correction value to the scheduled transmission cycle. In this case, the MFP 2 receives the transmission cycle of the data set 303 of the next time and thereafter. When this transmission cycle elapses from the transmission time, measured by the timer 26, of the data set 303 from the MFP 2 to the server 1, the MFP 2 transmits the data set 303 of the same data type to the server 1. As shown in FIG. 4, each time the MFP 2 transmits the data set 303, the MFP 2 receives the next transmission cycle. Hence, the overall flow of the processing of the load reduction system 100 is similar to the case where the next transmission time is transmitted.

[Modification 1]

In the server 1 of the load reduction system 100, the CPU 10 may determine a correction value depending on the data type included in the data set 303 received from the MFP 2. In this case, the memory 15 of the server 1 may store a correction value for each data type as the correction value information 173. And, the CPU 10 reads out, from the correction value information 173, the correction value corresponding to the data type of the data set 303, and determines the next transmission time by adding the correction value to the calculated scheduled transmission time.

With this operation, an appropriate correction value is added to the next transmission time depending on the data type. For example, in a case where the data type of the data set 303 is the remaining amount of consumable such as ink or in a case where the data type of the data set 303 is error information, the MFP 2 needs to promptly transmit, to the server 1, information of the data body of the data set 303. Hence, in the case where the data type in the correction value information 173 indicates the remaining amount of consumable or indicates error information, it is preferable that the correction value corresponding to this data type be smaller than a correction value corresponding to another data type.

In contrast, in a case where the data type of the data set 303 is just count information such as the number of printed sheets, there is little need to immediately transmit information of the data body of the data set 303. Hence, in the case where the data type indicates a count value in the correction value information 173, it is preferable that the correction value corresponding to this data type be larger than a correction value corresponding to another data type.

[Modification 2]

In the server 1 of the load reduction system 100, the CPU 10 may determine a correction value depending on the identification information included in the data set 303. In this case, the memory 15 of the server 1 may store a correction value for each identification information as the correction value information 173.

The model number, the type, and so on of the MFP 2 can be identified based on the identification information. Accordingly, by determining the correction value depending on the identification information, the server 1 adds an appropriate correction value to the scheduled transmission time. For example, in a case where the type of the MFP 2 (that is, the model type) is a long-life type, the correction value may be set to a larger value than the correction value of another type. This prevents shortening of the life of the MFP 2 due to frequent transmission and reception of data (and frequent rewriting of data in a nonvolatile memory such as NVRAM) in the MFP 2 of the long-life type. Further, in a case where the type of the MFP 2 is a low-price model, the correction value may be set to zero (correction value=0), or may be set to a smaller value than the correction value of another model.

[Modification 3]

In the load reduction system 100, the memory 15 of the server 1 may store user information in which the identification information of each MFP 2 and the identification information of the user are associated with each other. Further, the memory 15 may store terms information indicative of the terms of a lease contract of the MFP 2 for each user. Based on user information and identification information included in the data set 303, the CPU 10 may identify the user of the device that has transmitted the data set 303. Then, the CPU 10 may determine the correction value depending on the identified user. Alternatively, the CPU 10 may identify the terms of a contract corresponding to the identified user, and may determine the correction value depending on the terms of the contract.

For example, by referring to the user information in the memory 15, the CPU 10 identifies the user corresponding to identification information included in the data set 303. Further, the CPU 10 refers to the terms information, and identifies the terms of a contract corresponding to the identified user.

With this operation, an appropriate correction value is added to the scheduled transmission time depending on the user of the MFP 2. For example, it may be so configured that no correction value is added to the MFP 2 corresponding to a particular user or that a smaller correction value is added to such MFP 2 than to the MFP 2 of another user. With this operation, transmission and reception of the data set 303 can be performed for the MFP 2 of the particular user in priority to other users.

For example, it may be so configured that no correction value is added to the MFP 2 of a user who has special terms of a contract or that a smaller correction value is added to such MFP 2 than to the MFP 2 of a user who has different terms of a contract. In this way, in the case of special terms of a contract, transmission and reception of the data set 303 of the MFP 2 can be performed in priority to the case of other terms of a contract. Thus, the convenience of the MFP 2 can be differentiated depending on the user or depending on the terms of a contract.

Second Embodiment

A second embodiment of this disclosure will be described below, wherein like parts and components are designated by the same reference numerals to avoid duplicating description. The same goes for the subsequent embodiments.

In the load reduction system 100, the data set 303 may include state information indicative of the state of the MFP 2. The state information is, for example, the remaining amount of consumable such as ink, the number of rotations of a roll which is one of the mechanism of the printer unit 27, and so on (the roll may be a photosensitive drum, for example). The state information may be information indicated by the data type and the data body of the data set 303, or may be included in the data set 303 in addition to the data type and the data body.

And, the CPU 10 of the server 1 may determine the correction value depending on the state information of the received data set 303. In this case, the memory 15 of the server 1 may store a correction value for each content of the state information, as the correction value information 173.

For example, in a case where the remaining amount of ink in the correction value information 173 is smaller than a particular value, a smaller correction value may be set than a case where the remaining amount of ink is larger than or equal to the particular value. Further, in a case where the number of rotations of a roll is larger than or equal to a particular value, that is, in a case where an operational loss of the roll in printing (for example, idle rotations of a photosensitive drum) is larger than or equal to the particular value, a smaller correction value may be set than a case where the number of rotations of the roll is smaller than the particular value.

For example, in a case where the remaining amount of ink is small, the added correction value becomes smaller, and thus the data set 303 is transmitted preferentially to the server 1. Further, in a case where the number of rotations of a roll is larger than or equal to the particular value, that is, in a case where it is expected a failure of the roll occurs soon, the data set 303 is transmitted preferentially to the server 1. In this way, an appropriate correction value is added to the scheduled transmission time depending on the state of the MFP 2.

The server 1 of the load reduction system 100 may store the data set 303 for each MFP 2 in the data set database 171. And, the CPU 10 may estimate the maintenance timing of the MFP 2. The CPU 10 estimates the maintenance timing based on the data set 303 that is received from the MFP 2 and on the data set 303 stored in the memory 15 for the MFP 2 indicated by the identification information in the data set 303. In a case where a period up to the maintenance timing is shorter than a particular period, the CPU 10 may not add a correction value even if the load of the server 1 is higher than or equal to a particular threshold at the scheduled transmission time.

Figure 5:
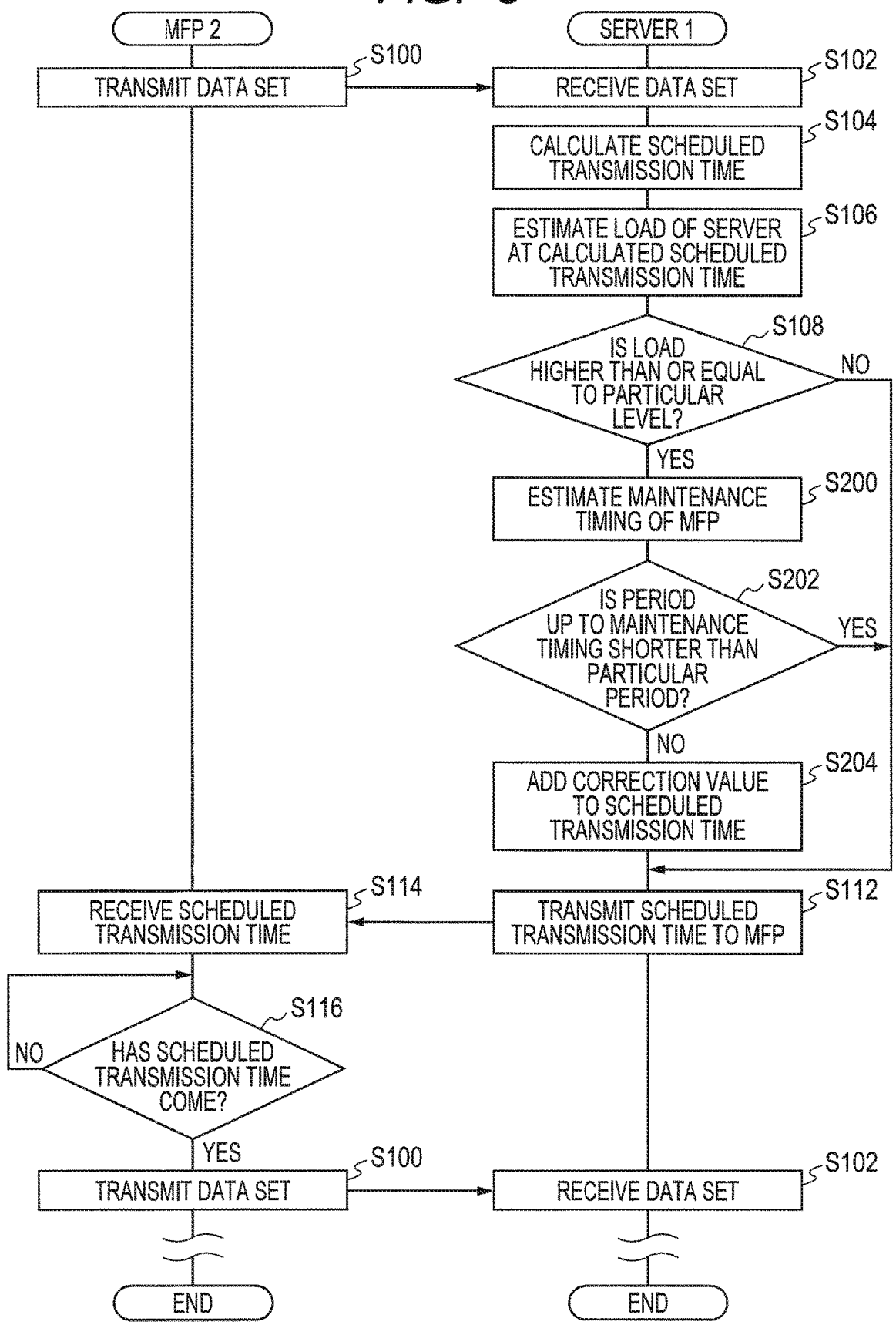
FIG. 5 shows one example of the flow of processing of a server and an MFP in a load reduction system according to a second embodiment.

As shown in FIG. 5 (descriptions are not repeated for the steps described with reference to FIG. 4), in the load reduction system 100 of the present embodiment, in a case where the load of the server 1 at the scheduled transmission time is higher than or equal to the particular level (S108: YES), the CPU 10 estimates maintenance timing of the MFP 2 (S200). The method of estimation is not limited to a particular method. For example, based on the state information included in the data set 303, the CPU 10 may estimate the maintenance timing of the MFP 2 indicated by the identification information included in the data set 303. For example, the number of rotations to replace a photosensitive drum is set preliminarily. Thus, the CPU 10 may regularly store date and time and the cumulative number of rotations in a memory, estimate, based on this information, the timing at which the number of rotations is expected to reach the number of rotations to replace the photosensitive drum, and regard that timing as the maintenance timing.

In a case where the period up to the maintenance timing is shorter than the particular period (S202: YES), the CPU 10 does not add a correction value. In a case where the period up to the maintenance timing is longer than or equal to the particular period (S202: NO), the CPU 10 determines the correction value depending on the state information of the received data set 303, and adds the correction value to the scheduled transmission time (S204). The processing after that is the same as that in FIG. 4.

According to the above-described processing, the server 1 transmits, as the next transmission time, the scheduled transmission time as it is (without adding a correction value) to the MFP 2 of which the maintenance timing is close. Thus, the server 1 preferentially receives the data set 303 from the MFP 2 having a higher degree of urgency of maintenance.

Third Embodiment

A third embodiment of this disclosure will be described below. In the load reduction system 100 of the present embodiment, in a case where next transmission time is included in a non-communication period during which the server 1 is unable to communicate with each of the MFPs 2, the CPU 10 may transmit, to the MFP 2, adjusted transmission time that is obtained by adjusting (shifting) the next transmission time to time after the non-communication period ends.

The memory 15 of the server 1 in the present embodiment stores maintenance information. The maintenance information is information indicative of a maintenance period of the server 1. For example, the maintenance information may be identification information of a maintenance work associated with information indicative of the period of the maintenance work.

Figure 6:
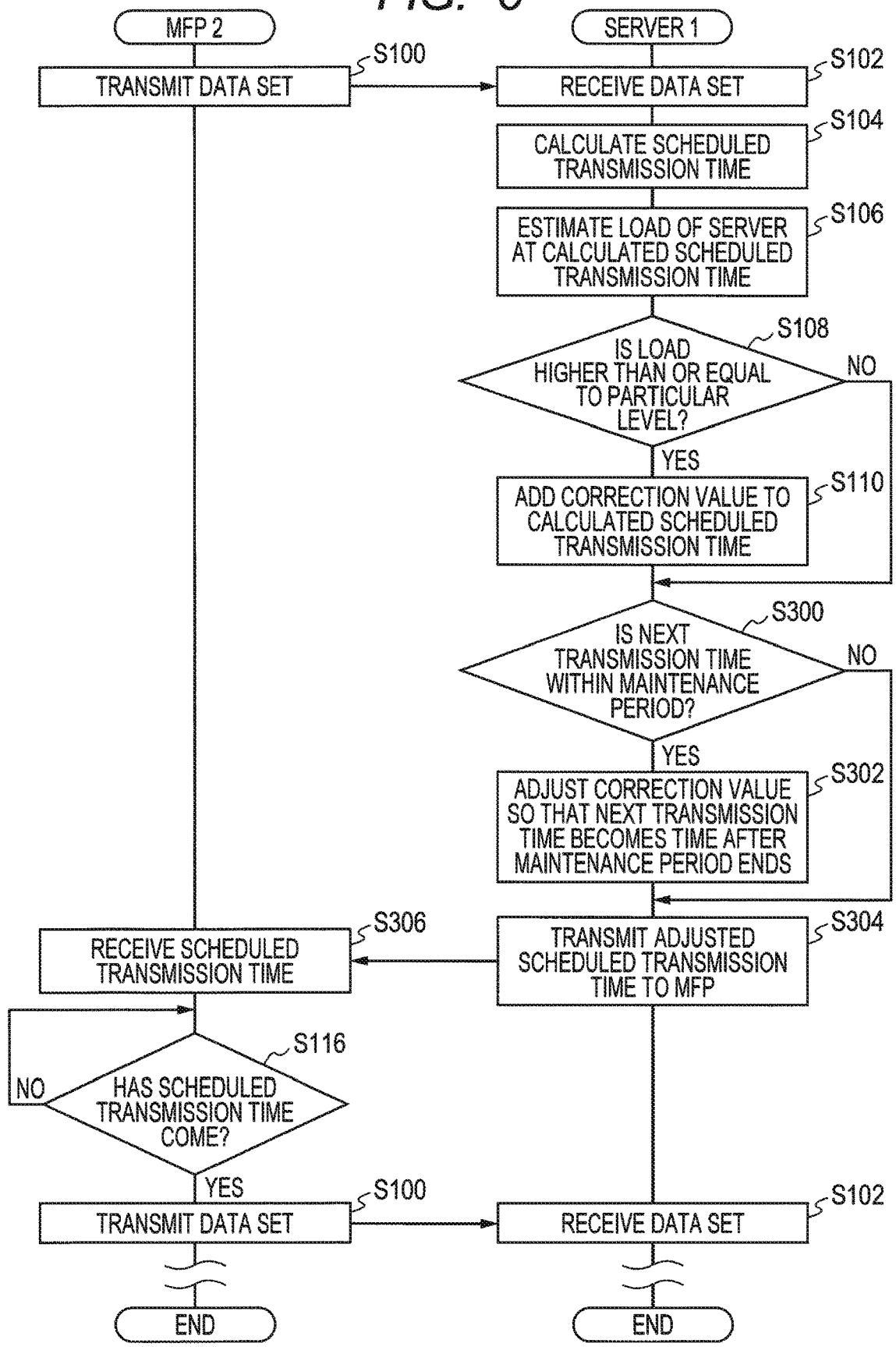
FIG. 6 shows one example of the flow of processing of a server and an MFP in a load reduction system according to a third embodiment.

As shown in FIG. 6 (descriptions are not repeated for the steps described with reference to FIG. 4), in the load reduction system 100 of the present embodiment, in the case of NO in S108 or after the processing of S110, the CPU 10 determines whether the next transmission time is within a maintenance period (S300). For example, the CPU 10 refers to the maintenance information stored in the memory 15 and determines whether the next transmission time is included in one of maintenance periods.

In response to determining that the next transmission time is not included in any maintenance period (S300: NO), the CPU 10 does not adjust the next transmission time. In response to determining that the next transmission time is included in one of maintenance periods (S300: YES), the CPU 10 adjusts the next transmission time to time after the non-communication period ends (S302) (in other words, the CPU 10 adjusts the correction value so that the next transmission time becomes time after the maintenance period ends), and transmits the adjusted transmission time to the MFP 2 as the next transmission time (S304). In response to receiving the next transmission time (S306), the MFP 2 executes the processing of S116 and thereafter in FIG. 4.

According to the above-described processing, in a case where there is a period during which the server 1 is unable to communicate with the MFP 2 due to maintenance and so on, transmission of the data set 303 within that period is prevented.

Fourth Embodiment

A fourth embodiment of this disclosure will be described below. In the load reduction system 100 of the present embodiment, the CPU 10 may receive, from the MFP 2, startup information indicative of startup of the MFP 2. Further, the CPU 10 may calculate next transmission time of the data set 303 from the MFP 2 depending on the reception time of the startup information and on the data type identified from identification information of the MFP 2 included in the startup information. Then, the CPU 10 may transmit the next transmission time to the MFP 2.

Figure 7:
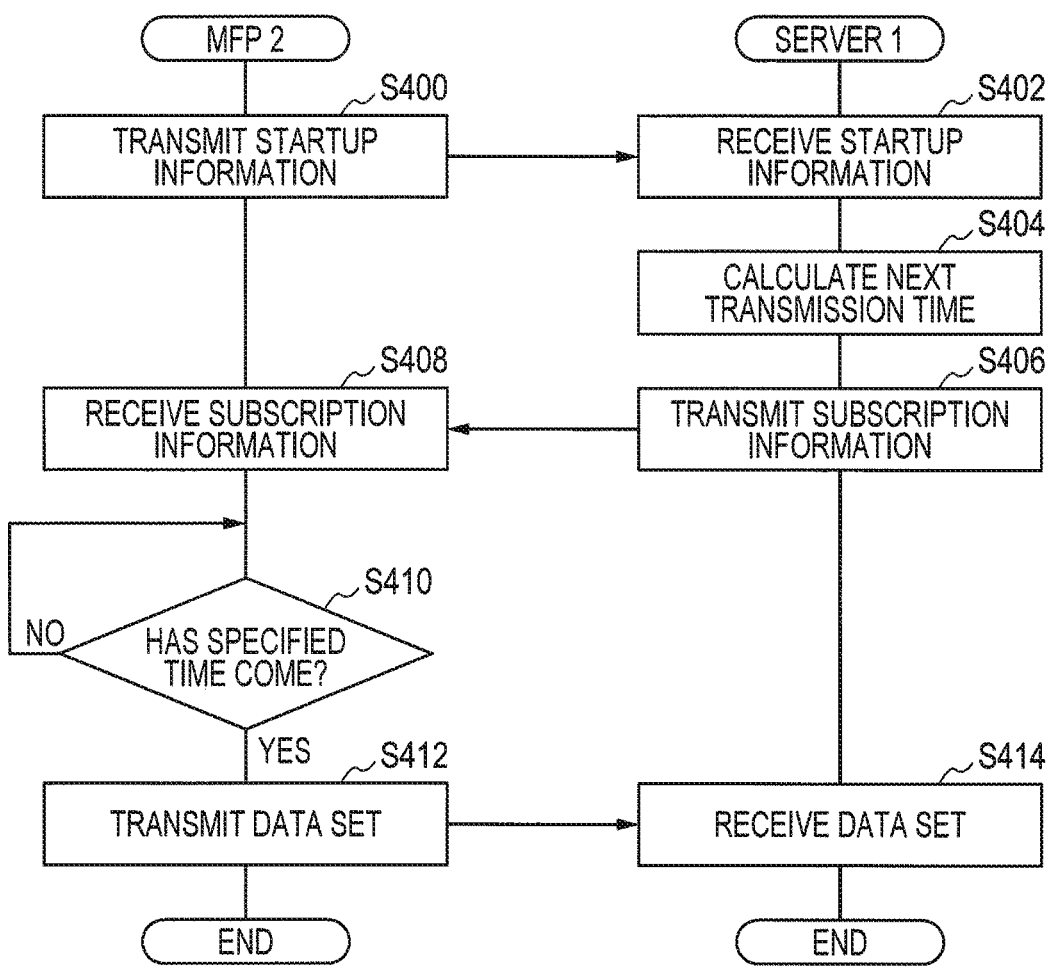
FIG. 7 shows one example of the flow of processing of a server and an MFP in a load reduction system according to a fourth embodiment.

As shown in FIG. 7, upon starting up, the MFP 2 transmits startup information to the server 1 (S400). The CPU 10 of the server 1 receives the startup information through the network interface 12 (S402). The startup information includes information indicative of identification information of the MFP 2. In the server 1, once the identification information is identified, the data type of a data set to be transmitted immediately after the startup can be identified. For example, the server 1 identifies the data type of the data set based on the identification information of the MFP 2 as below. For example, the server 1 preliminarily stores the data type (the remaining amount of ink, the remaining amount of toner, and so on) for each model as a database. And, the server 1 identifies the model of the MFP 2 based on the identification information of the MFP 2, and identifies the data type by referring to the database.

The CPU 10 calculates next transmission time of the data set 303 based on the reception time of the startup information and on the data type identified from the identification information included in the startup information (S404). The CPU 10 transmits, to the MFP 2, subscription information including the calculated next transmission time (S406). The CPU 20 of the MFP 2 receives the subscription information (S408), and stands by until the time specified by the subscription information comes (S410: NO). When the specified time comes (S410: YES), the CPU 20 transmits the data set 303 to the server 1 (S412), and the CPU 10 of the server 1 receives the data set 303 (S414).

According to the above-described processing, the next transmission time of a data set is transmitted at the startup of the device. Thus, after startup, the data set can be acquired at appropriate timing.

In a case where the CPU 10 receives startup information from the MFP 2 before the time specified by the subscription information received in S408, that is, before the next transmission time of the data set 303 (a case in which the MFP 2 receives next transmission time but is restarted before the next transmission time comes), the CPU 10 may recalculate the next transmission time based on the reception time of the startup information and on the next transmission time transmitted to the MFP 2. Then, the CPU 10 may transmit the recalculated next transmission time to the MFP 2. The recalculated next transmission time may be the next transmission time that is already transmitted to the MFP 2. Alternatively, the recalculated next transmission time may be between the next transmission time that is already transmitted to the MFP 2 and the time obtained by adding the transmission cycle to the reception time of the startup information.

With this operation, in a case where the data set 303 received immediately after the startup of the MFP 2 is received before the specified time, the next transmission time is recalculated and notified. Thus, the data set 303 immediately after startup can be acquired at appropriate timing.

In a case where the CPU 10 receives startup information after the next transmission time of the data set 303 specified before has already elapsed (a case in which the MFP 2 is in a power-off state at the next transmission time and is restarted after the next transmission time has elapsed), the CPU 10 may recalculate the next transmission time of the data set 303 as the time immediately after the reception time of the startup information. Then, the CPU 10 may transmit the recalculated next transmission time to the device.

With this operation, in a case where the data set 303 to be received immediately after the startup of the MFP 2 is not received even after the specified transmission time elapses, the MFP 2 is notified to immediately transmit the data set 303. Thus, the data set 303 can be acquired promptly.

[Embodiments by Software]

The functions of the CPU 10 and the CPU 20 may be realized by a logic circuit (hardware) formed on an integrated circuit (IC chip) and so on, or may be realized by software.

In the latter case, each of the CPU 10 and the CPU 20 includes a computer that executes instructions of a program that is software for realizing each function. This computer includes, for example, at least one processor and a computer-readable storage medium storing the program. In the computer, the processor reads the program from the storage medium and executes the program, thereby achieving the object of this disclosure. As the processor, for example, a CPU (Central Processing Unit) may be used. As the storage medium, a "non-transitory tangible medium" such as a ROM (Read Only Memory), a tape, a disc, a card, a semi-conductor memory, and a programmable logic circuit may be used. Further, a RAM (Random Access Memory) for expanding the program and so on may be provided. Further, the program may be supplied to the computer through any transmission medium by which the program can be transmitted (communication network, broadcast wave, and so on). An aspect of this disclosure may be realized in a mode of data signal embedded in a carrier wave that is embodied by transmitting the program electronically.

While the disclosure has been described in detail with reference to the above aspects thereof, it would be apparent to those skilled in the art that various changes and modifications may be made therein without departing from the scope of the claims. The scope of this disclosure also includes embodiments that are obtained by combining technical features shown in different embodiments.

What is claimed is:

1. A management apparatus comprising:
an interface configured to communicate with a plurality of devices;
a controller; and
a memory storing instructions, the instructions, when executed by the controller, causing the management apparatus to perform:
receiving a data set from a target device that is one of the plurality of devices via the interface, the data set including a data type, a data body, and identification information of the target device;
each time the data set is received, calculating scheduled transmission time for the target device based on reception time of the data set and on the identification information and the data type included in the data set, the scheduled transmission time being scheduled time at which the target device transmits the data set to the management apparatus;
estimating a load of the management apparatus at the scheduled transmission time based on the scheduled transmission time and on next transmission time of the data set for the plurality of devices other than the target device; and
in a case where the load is higher than a particular level, transmitting, to the target device via the interface, corrected transmission time as next transmission time for the target device, the corrected transmission time being obtained by adding a correction value to the scheduled transmission time,
the correction value being determined based on at least one of the data type, the identification information of the target device or state information indicative of a state of the target device.

2. The management apparatus according to claim 1, wherein the instructions, when executed by the controller, cause the management apparatus to, in a case where the load is lower than the particular level, transmit, to the target device via the interface, the scheduled transmission time as the next transmission time.

3. The management apparatus according to claim 1, wherein the instructions, when executed by the controller, cause the management apparatus to determine the correction value depending on the data type.

4. The management apparatus according to claim 1, wherein the instructions, when executed by the controller, cause the management apparatus to determine the correction value depending on the identification information of the target device.

5. The management apparatus according to claim 1, wherein the data set includes state information indicative of a state of the target device; and
wherein the instructions, when executed by the controller, cause the management apparatus to determine the correction value depending on the state information.

6. The management apparatus according to claim 5, wherein the memory is configured to store the data set for each of the plurality of devices; and
wherein the instructions, when executed by the controller, cause the management apparatus to:
estimate maintenance timing of the target device based on the data set received from the target device and on the data set stored in the memory for the target device indicated by the identification information in the received data set; and
in a case where a period up to the maintenance timing is shorter than a particular period, transmit, to the target device via the interface, the scheduled transmission time as the next transmission time for the target device without adding the correction value to the scheduled transmission time.

7. The management apparatus according to claim 1, wherein the memory is configured to store user information including identification information of each of the plurality of devices and identification information of a user in association with each other; and
wherein the instructions, when executed by the controller, cause the management apparatus to:
identify a user of the target device based on the identification information of the target device included in the data set and on the user information; and
determine the correction value depending on the identified user.

8. The management apparatus according to claim 1, wherein the instructions, when executed by the controller, cause the management apparatus to:
in a case where the next transmission time for the target device is within a non-communication period in which the management apparatus is unable to communicate with each the plurality of devices, transmit, to the target device via the interface, an adjusted transmission time that is time after the non-communication period ends.

9. The management apparatus according to claim 1, wherein the instructions, when executed by the controller, cause the management apparatus to:
receive, from the target device via the interface, startup information indicative of startup of the target device;
calculate the next transmission time for the target device based on reception time of the startup information and on a data type identified from identification information of the target device included in the startup information; and
transmit the calculated next transmission time to the target device via the interface.

10. The management apparatus according to claim 9, wherein the instructions, when executed by the controller, cause the management apparatus to:
in a case where the startup information is received from the target device before the next transmission time for the target device comes, recalculate the next transmission time based on the reception time of the startup information and on the next transmission time already transmitted to the target device; and
transmit the recalculated next transmission time to the target device via the interface.

11. The management apparatus according to claim 9, wherein the instructions, when executed by the controller, cause the management apparatus to:
in a case where the next transmission time for the target device has already elapsed when the startup information is received, set the next transmission time to time immediately after the reception time of the startup information; and
transmit the set next transmission time to the target device via the interface.

12. The management apparatus according to claim 1, wherein the instructions, when executed by the controller, cause the management apparatus to, in a case where the data type indicates a remaining amount of consumable or error information, set the correction value to be smaller than a correction value corresponding to another data type.

13. The management apparatus according to claim 1, wherein the instructions, when executed by the controller, cause the management apparatus to:
- determine a model type from the identification information of the target device; and
- in a case where the model type is a long-life type, set the correction value to a larger value than a correction value of another type.

14. The management apparatus according to claim 1, wherein the instructions, when executed by the controller, cause the management apparatus to:
- determine a model type from the identification information of the target device; and
- in a case where the model type is a low-price model, set the correction value to zero or to a smaller value than a correction value of another model.

15. The management apparatus according to claim 1, wherein the state information is a remaining amount of consumable;
- wherein the instructions, when executed by the controller, cause the management apparatus to:
- in a case where the remaining amount of consumable is smaller than a particular value, set the correction value to a smaller value than a case where the remaining amount of consumable is larger than or equal to the particular value.

16. The management apparatus according to claim 1, wherein the state information is a number of rotations of a roll;
- wherein the instructions, when executed by the controller, cause the management apparatus to:
- in a case where the number of rotations of the roll is larger than or equal to a particular value, set the correction value to a smaller value than a case where the number of rotations of the roll is smaller than the particular value.

17. A method of controlling a management apparatus configured to communicate with a plurality of devices, the method comprising:
- receiving a data set from a target device that is one of the plurality of devices, the data set including a data type, a data body, and identification information of the target device;
- each time the data set is received, calculating scheduled transmission time for the target device based on reception time of the data set and on the identification information and the data type included in the data set, the scheduled transmission time being scheduled time at which the target device transmits the data set to the management apparatus;
- estimating a load of the management apparatus at the scheduled transmission time based on the scheduled transmission time and on next transmission time of the data set for the plurality of devices other than the target device; and
- in a case where the load is higher than a particular level, transmitting, to the target device, corrected transmission time as next transmission time for the target device, the corrected transmission time being obtained by adding a correction value to the scheduled transmission time,
- the correction value being determined based on at least one of the data type, the identification information of the target device or state information indicative of a state of the target device.

18. A non-transitory computer-readable storage medium storing a control program including a set of instructions readable by a controller of a management apparatus configured to communicate with a plurality of devices, the set of instructions, when executed by the controller, causing the management apparatus to perform:
- receiving a data set from a target device that is one of the plurality of devices, the data set including a data type, a data body, and identification information of the target device;
- each time the data set is received, calculating scheduled transmission time for the target device based on reception time of the data set and on the identification information and the data type included in the data set, the scheduled transmission time being scheduled time at which the target device transmits the data set to the management apparatus;
- estimating a load of the management apparatus at the scheduled transmission time based on the scheduled transmission time and on next transmission time of the data set for the plurality of devices other than the target device; and
- in a case where the load is higher than a particular level, transmitting, to the target device, corrected transmission time as next transmission time for the target device, the corrected transmission time being obtained by adding a correction value to the scheduled transmission time,
- the correction value being determined based on at least one of the data type, the identification information of the target device or state information indicative of a state of the target device.

19. The non-transitory computer-readable storage medium according to claim 18, wherein the instructions, when executed by the controller, causes the management apparatus to determine the correction value depending on the data type.

20. The non-transitory computer-readable storage medium according to claim 18, wherein the instructions, when executed by the controller, cause the management apparatus to determine the correction value depending on the identification information of the target device.

21. The non-transitory computer-readable storage medium according to claim 18, wherein the data set includes state information indicative of a state of the target device; and
- wherein the instructions, when executed by the controller, cause the management apparatus to determine the correction value depending on the state information.

22. The non-transitory computer-readable storage medium according to claim 21, wherein the memory is configured to store the data set for each of the plurality of devices; and
- wherein the instructions, when executed by the controller, cause the management apparatus to:
- estimate maintenance timing of the target device based on the data set received from the target device and on the data set stored in the memory for the target device indicated by the identification information in the received data set; and
- in a case where a period up to the maintenance timing is shorter than a particular period, transmit, to the target device, the scheduled transmission time as the next transmission time for the target device without adding the correction value to the scheduled transmission time.

23. The non-transitory computer-readable storage medium according to claim 18, wherein the memory is configured to store user information including identification information of each of the plurality of devices and identification information of a user in association with each other; and wherein the instructions, when executed by the controller, cause the management apparatus to:
identify a user of the target device based on the identification information of the target device included in the data set and on the user information; and
determine the correction value depending on the identified user.

24. The non-transitory computer-readable storage medium according to claim 18, wherein the instructions, when executed by the controller, cause the management apparatus to:
in a case where the next transmission time for the target device is within a non-communication period in which the management apparatus is unable to communicate with each the plurality of devices, transmit, to the target device, an adjusted transmission time that is time after the non-communication period ends.

25. The non-transitory computer-readable storage medium according to claim 18, wherein the instructions, when executed by the controller, cause the management apparatus to:
receive, from the target device, startup information indicative of startup of the target device;
calculate the next transmission time for the target device based on reception time of the startup information and on a data type identified from identification information of the target device included in the startup information; and
transmit the calculated next transmission time to the target device.

* * * * *